(12) United States Patent
Qian et al.

(10) Patent No.: US 8,977,280 B2
(45) Date of Patent: Mar. 10, 2015

(54) NODE AND METHOD FOR DETERMINING LINK ADAPTATION PARAMETERS

(71) Applicant: Telefonaktiebolaget LM Ericsson (publ), Stockholm (SE)

(72) Inventors: Yu Qian, Beijing (CN); Yang Hu, Beijing (CN); Jinhua Liu, Beijing (CN); Huaisong Zhu, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 132 days.

(21) Appl. No.: 13/814,277

(22) PCT Filed: Dec. 20, 2012

(86) PCT No.: PCT/CN2012/087068
§ 371 (c)(1),
(2) Date: Feb. 5, 2013

(87) PCT Pub. No.: WO2014/094282
PCT Pub. Date: Jun. 26, 2014

(65) Prior Publication Data
US 2014/0179332 A1 Jun. 26, 2014

(51) Int. Cl.
*H04W 72/00* (2009.01)
*H04W 72/12* (2009.01)
*H04W 52/28* (2009.01)
*H04W 28/26* (2009.01)

(52) U.S. Cl.
CPC ........ *H04W 72/1231* (2013.01); *H04W 52/285* (2013.01); *H04W 28/26* (2013.01)
USPC .... 455/452.1; 455/450; 370/329; 370/395.21

(58) Field of Classification Search
USPC .......... 455/452.1, 450, 422.1, 63.1, 436, 440, 455/441; 370/328–338, 395.21
See application file for complete search history.

(56) References Cited

U.S. PATENT DOCUMENTS

| | | | |
|---|---|---|---|
| 6,018,818 A | 1/2000 | Sheynblat | |
| 2004/0043772 A1* | 3/2004 | Quirke et al. | 455/456.1 |
| 2007/0159993 A1 | 7/2007 | Classon et al. | |
| 2010/0234071 A1 | 9/2010 | Shabtay et al. | |

(Continued)

FOREIGN PATENT DOCUMENTS

| | | |
|---|---|---|
| CN | 1276956 A1 | 12/2000 |
| CN | 101834701 A | 9/2010 |

(Continued)

*Primary Examiner* — Chuong A Ngo
(74) *Attorney, Agent, or Firm* — Murphy Bilak & Homiller, PLLC

(57) ABSTRACT

The present invention relates to a method for determining link adaptation parameters for a wireless device. The method is performed in a first radio network node of a wireless communication system. The first radio network node hosts a first cell serving the wireless device. The wireless device is interfered by a second cell. The method comprises predicting (410) a future position of the wireless device. The method also comprises estimating (420) a first radio channel quality value for the wireless device in the predicted future position, based on: pathloss values related to the wireless device in the predicted future position for the first and the second cell respectively; and a transmission power of the second cell. The method further comprises determining (430) link adaptation parameters for the scheduling of the wireless device in the future position using the estimated first radio channel quality value.

27 Claims, 5 Drawing Sheets

(56) References Cited

U.S. PATENT DOCUMENTS

| | | |
|---|---|---|
| 2011/0044231 A1 | 2/2011 | Shahar |
| 2011/0143793 A1 | 6/2011 | Kim |
| 2011/0212720 A1 | 9/2011 | Hamalainen et al. |
| 2011/0275378 A1 | 11/2011 | Kwon et al. |
| 2012/0082038 A1 | 4/2012 | Xu et al. |
| 2013/0182649 A1* | 7/2013 | Kwon et al. ........ 370/328 |
| 2013/0343321 A1* | 12/2013 | Nordstrom et al. ........ 370/329 |

FOREIGN PATENT DOCUMENTS

| | | |
|---|---|---|
| CN | 102036393 A | 4/2011 |
| CN | 102742312 A | 10/2012 |
| EP | 1455547 A1 | 9/2004 |
| JP | 2010239217 A | 10/2010 |
| KR | 20080026183 A | 3/2008 |
| WO | 2006036089 A1 | 4/2006 |
| WO | 2006103283 A1 | 10/2006 |

\* cited by examiner

NODE AND METHOD FOR DETERMINING LINK ADAPTATION PARAMETERS

TECHNICAL FIELD

The disclosure relates to link adaptation, and more specifically to a radio network node and a method for determining link adaptation parameters for a wireless device.

BACKGROUND

Long Term Evolution (LTE) is the fourth-generation mobile communication technologies standard developed within the $3^{rd}$ Generation Partnership Project (3GPP) to improve the Universal Mobile Telecommunication System (UMTS) standard to cope with future requirements in terms of improved services such as higher data rates, improved efficiency, and lowered costs. The Universal Terrestrial Radio Access Network (UTRAN) is the radio access network of a UMTS and Evolved UTRAN (E-UTRAN) is the radio access network of an LTE system. In an E-UTRAN, a User Equipment (UE) is wirelessly connected to a Radio Base Station (RBS) commonly referred to as an evolved NodeB (eNodeB). An RBS is a general term for a radio network node capable of transmitting radio signals to a UE and receiving signals transmitted by a UE.

FIG. 1 illustrates a conventional radio access network in an LTE system. An eNodeB 100 with a transmission point 101 serves a UE 103 located within the eNodeB's geographical area of service also called a cell 105. The eNodeB 100 manages the radio resources in its cell 105 and is directly connected to the CN (not illustrated). The eNodeB 100 is also connected via an X2 interface to a neighboring eNodeB 150 with a transmission point 151 serving another cell 155.

Radio Resource Management (RRM) plays a crucial role in how resources in a wireless communications system are used. In particular, RRM techniques in wireless communications systems are of high importance as they largely influence how efficiently the system is used. Two RRM functionalities, scheduling and Link Adaptation (LA), play a central role for resource allocation and have a significant influence on system performance. These two RRM functionalities work tightly together. The scheduling allocates a certain part of a spectrum, i.e. of the available frequency resources, to a certain UE during a certain amount of time. The LA computes how many bits that may be transmitted in the scheduled part of the frequency resource given operating channel conditions, a transmit power and a desired probability of a correct reception. LA is thus a matching of the modulation, coding and other signal and protocol parameters to the conditions on the radio link such as the pathloss, and the interference due to signals coming from other transmitters.

The scheduling and LA are used in a way that optimizes a frequency resource utilization in every cell separately. Other RRM functionalities promote the coordination between different cells, and are also very important for a good wireless communications system performance. There are for instance schemes that try to mitigate and coordinate interference among different cells, commonly referred to as Inter-Cell Interference Coordination (ICIC) schemes. ICIC schemes try to coordinate a generated inter-cell interference between cells so that the effect of the generated interference becomes less detrimental, typically by utilizing feedback and exchanging information between neighboring radio base stations. ICIC schemes usually work on a slower basis than the scheduling and LA in order to mitigate the increased overhead and complexity arising from the extra information exchange, signaling, and processing needed for ICIC.

A main operating principle in conventional scheduling and LA is to transmit as many data bits as possible given a certain frequency resource allocation, or expressed in another way, to find a smallest possible frequency resource allocation given a certain number of data bits to transmit. At the same time, a certain probability of correct reception under the operating channel conditions should be satisfied. A commonly used criterion for the probability of correct reception is a Block Error Rate (BLER) target.

LA requires channel state information at the transmitter. This could be acquired in time division duplex systems by assuming that the channel from the transmitter to the receiver is approximately the same as the channel from the receiver to the transmitter. Alternatively, the channel knowledge can also be directly measured at the receiver, and fed back to the transmitter. LA improves the rate of transmission, and/or the bit error rates, by exploiting the channel state information that is present at the transmitter.

Channel Quality Indicator (CQI) is an indicator of the communication quality of wireless channels. CQI can be a value or values indicating a measure of channel quality for a given channel. Typically, a high value of CQI is indicative of a channel with high quality and vice versa. A CQI for a channel can be computed by making use of performance metrics, such as a Signal-to-Noise Ratio (SNR), Signal-to-Interference plus Noise Ratio (SINR), and Signal-to-Noise plus Distortion Ratio (SNDR) for the channel. These values and others can be measured for a given channel and may then be used to determine a CQI for the channel.

LA based on CQI measurements made by the UE and reported to the RBS has been employed in wireless networks for a long time. However, due to the delay between feedback timing and scheduling timing, the RBS has to use an "old" measurement result to estimate the CQI, predict the channel quality, and decide the LA parameters, such as the Modulation and Coding Scheme (MCS) for the next scheduled occasion for a UE transmission.

Furthermore, since channel quality prediction errors always exist, e.g. due to rapid channel variations and CQI estimation errors, the LA accuracy may be impaired. This may eventually lead to a lower throughput. Hereinafter, two conventional methods to improve LA quality are described.

1) Open-Loop LA (OLLA):

OLLA is an improved LA mechanism on the network side. The acknowledgement/non-acknowledgement (ACK/NACK) feedback from a hybrid automatic repeat request (HARQ) procedure is used to assist in the MCS decision. When a packet transmitted with a given MCS is successfully received by the UE, that is when the RBS receives an ACK associated with the packet, the channel quality prediction is increased by a small step. On the other hand, if the RBS receives a NACK associated with the packet, which means that the packet is not successfully received by the UE, the channel quality prediction is decreased by a large step. By tuning the step sizes, the BLER can be kept at a given level, e.g. 10%, and the throughput can be optimized. The channel quality prediction tuning is accumulative. The OLLA mechanism can be formulized according to the following:

$$\text{SINROLLA} = \text{CQIorg} - \text{Step\_acc} \quad (1)$$

where SINROLLA denotes the OLLA-adjusted channel quality indicator. An accumulative step, Step_acc, is thus deduced from the original CQI, CQIorg, to obtain the SINROLLA. CQIorg may be filtered.

2) Coordinated Scheduling:

Coordinated scheduling in the scope of ICIC, enables another way to mitigate the impact from inter-cell interference. The eNodeBs may share scheduling info, including transmission power levels, in order to adjust the CQI based on it for use in LA.

However, the accuracy of LA in cellular networks can be seriously impaired by unexpected inter-cell interference variation as well as own signal variation, even if OLLA and coordinated scheduling is employed, as will be described hereinafter.

To keep a certain quality of service, OLLA has to be conservative for a wireless system. In a typical configuration of OLLA, the increasing step is configured to be $1/10$ of the decreasing step. In this way a 10% BLER can be achieved to balance the downlink throughput and the transmission delay. A sharp SINR decrease in the time domain may therefore be captured, such that a lower channel quality prediction is used to secure successful transmission. However, a sharp SINR increase in time domain cannot be captured as fast as the SINR decrease due to the size difference between the increasing and the decreasing step.

A SINR variation caused by an unexpected inter-cell interference variation could be due to three reasons: a variation of the interfering cell signal due to a variation of transmission power in the interfering cell, a variation of the interfering cell signal due to slow fading, or a variation of the interfering cell signal due to fast fading. The SINR variation caused by the own cell signal variation could be due to slow fading or fast fading.

Fast fading variations may be mitigated by time-domain filtering. SINR variations due to a variation of transmission power in the interfering cell can be predicted by using information received from interfering neighbors via coordinated scheduling. However, a rapid variation of a slow fading, which may be the case when the UE is moving fast, is not possible to predict with current LA methods.

FIG. 2 illustrates an example scenario of when a rapid variation of slow fading is present for a UE 203, due to that the UE 203 is used by a user in a vehicle rapidly passing by a building 202 hindering the signal path from a transmission point 201, and thus creating rapid variations of the slow fading when passing from area A to area B, as well as from area B to area C. Area B is the area shadowed by the building 202. If it is assumed that the transmission point 201 corresponds to an eNodeB hosting the serving cell of the UE, the radio channel quality, e.g. measured as the SINR, drops sharply when the car moves from area A to area B. As the UE moves rapidly, there is a high probability that the SINR drop happens before the next CQI report update arrives. If the OLLA mechanism in accordance with formula [1] above is used, the channel quality prediction estimation SINROLLA will be reduced by large accumulative steps, Step_acc, in order to adapt the SINROLLA to the true channel quality. However, the Step_acc will not be reset at once when SINR increases again, since the eNodeB does not know whether Step_acc is used to compensate for a channel quality variation or a channel estimation error. When the original CQI, CQIorg, is updated later based on a new CQI report, the UE may already be in area C, and the reduced Step_acc has resulted in a scheduled throughput that is lower than it should have been.

If it is assumed that the transmission point 201 in FIG. 2 corresponds to an eNodeB hosting a cell which is the cell interfering the UE 203, the interference is decreased when the UE moves from area A to area B. The UE will use Step_acc to mitigate the interference variation. However, the channel quality prediction is increased by a small step for each received ACK. The OLLA mechanism requires a lot of ACK from the UE to be sure that the air interface and the channel really has become better. Therefore, the modification of SINROLLA may take quite some time.

Even if the pathloss value for the UE associated with the interfering cell does not vary as is does in FIG. 2 when the transmission point 201 transmits the interfering cell, there may still be a variation of the interference due to that the downlink transmission from the interfering cell varies in the time domain. The interference may thus appear now and then over time. The OLLA may fail to capture also this variation in an accurate way in analogy with the scenario described above in FIG. 2.

SUMMARY

It is therefore an object to address at least some of the problems addressed above, and to improve the CQI estimation by taking the own cell's signal variation as well as inter-cell interference variation into account. This object and others are achieved by the method and the radio network node according to the independent claims, and by the embodiments according to the dependent claims.

In accordance with a first aspect of embodiments, a method for determining LA parameters for a wireless device is provided. The method is performed in a first radio network node of a wireless communication system. The first radio network node hosts a first cell serving the wireless device. The wireless device is interfered by a second cell. The method comprises predicting a future position of the wireless device. The method also comprises estimating a first radio channel quality value for the wireless device in the predicted future position, based on: pathloss values related to the wireless device in the predicted future position for the first and the second cell respectively; and a transmission power of the second cell. The method further comprises determining LA parameters for the scheduling of the wireless device in the future position using the estimated first radio channel quality value.

In accordance with a second aspect of embodiments, a first radio network node for a wireless communication system is provided. The first radio network node is configured to determine LA parameters for a wireless device and to host a first cell serving the wireless device. The wireless device is interfered by a second cell. The first radio network node comprises a memory and a processor. The processor is configured to predict a future position of the wireless device. The processor is also configured to estimate a first radio channel quality value for the wireless device in the predicted future position, based on: pathloss values related to the wireless device in the predicted future position for the first and the second cell respectively; and a transmission power of the second cell. The processor is further configured to determine LA parameters for the scheduling of the wireless device in the future position using the estimated first radio channel quality value.

An advantage of embodiments is that the throughput may be improved, as the LA parameters are based on improved radio channel quality estimations.

A further advantage of embodiments is that a slow recovery of the channel quality estimation from a sharp channel quality drop may be avoided, which will allow for saved channel capacity and/or improved throughput.

Other objects, advantages and features of embodiments will be explained in the following detailed description when considered in conjunction with the accompanying drawings and claims.

DETAILED DESCRIPTION

In the following, different aspects will be described in more detail with references to certain embodiments of the invention and to accompanying drawings. For purposes of explanation and not limitation, specific details are set forth, such as particular scenarios and techniques, in order to provide a thorough understanding of the different embodiments. However, other embodiments that depart from these specific details may also exist.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while embodiments of the invention are primarily described in the form of a method and a node, they may also be embodied in a computer program product as well as in a system comprising a computer processor and a memory coupled to the processor, wherein the memory is encoded with one or more programs that may perform the functions disclosed herein.

Figure 1:
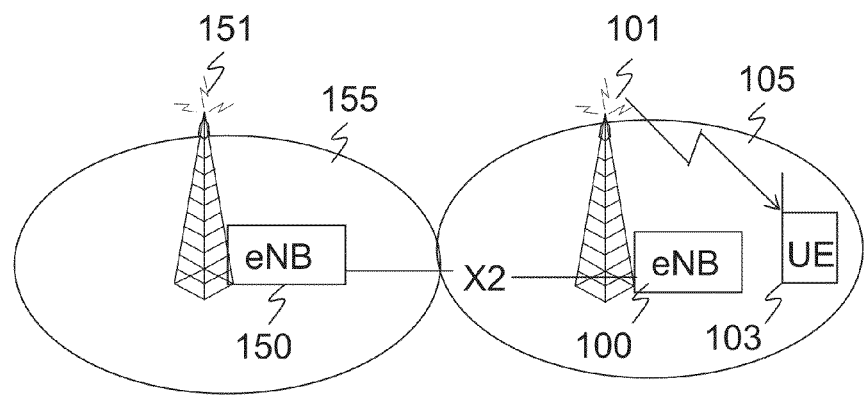
FIG. 1 is a schematic illustration of a radio access network in LTE.

Embodiments are hereinafter described in a non-limiting general context in relation to an example scenario in E-UTRAN illustrated in FIG. 1, where a UE 103 is served by a first cell 105 hosted by a first eNodeB 100, and is interfered by a second cell 155 hosted by a second eNodeB 150. The first eNodeB 100 determines LA parameters comprising modulation schemes and channel coding rates for the UE. However, it should be noted that the embodiments may be applied to any radio access technology where a radio network node controlling the transmission of a UE determines LA parameters for the UE transmission. Furthermore, other types of LA parameters are possible, determined for any kind of wireless device, such as a UE, a portable computer, or a smartphone.

Figure 2:
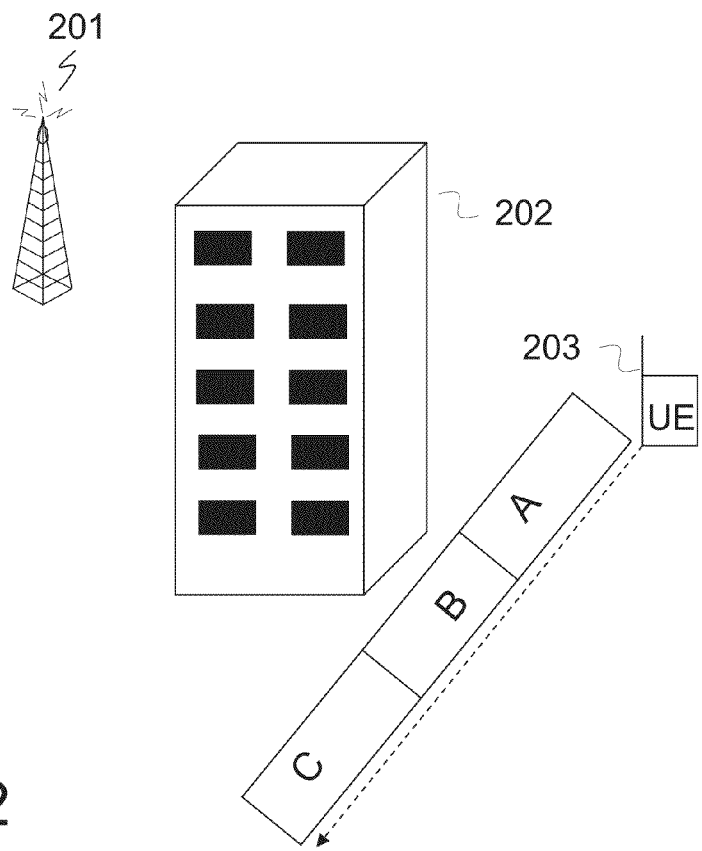
FIG. 2 is a schematic illustration of a scenario with rapid variation of slow fading for a UE.

As already described above, the OLLA mechanism may fail to capture the variation of SINR in a situation as the one described above with reference to FIG. 2 in an accurate way. It should also be mentioned that coordinated scheduling is of no help in this scenario. Even if the serving eNodeB receives information about the transmission power of the neighbor interfering eNodeB, it does not know the received interference power level and how it varies at the UE. Basing a CQI adaptation on the transmission power of the neighbor eNodeB may result in a too big reduction of the reported CQI, e.g. when the UE is in region B of FIG. 2.

The problem of rapid inter-cell interference variations affecting the channel quality is addressed herein by a solution where a future position of a UE is predicted. Furthermore, a radio channel quality value in the predicted future UE position is estimated based on the serving cell pathloss and the interfering cell pathloss, and on information about the interfering cell's transmission power. The radio network node utilizes the information about the interfering cell's transmission power together with the interfering cell pathloss to predict the power received at the UE from the interfering cell. LA parameters are then determined using the estimated radio channel quality value, and the LA parameters are used for the data transmission at the next scheduling occasion.

Position Assisted LA

Figure 3:
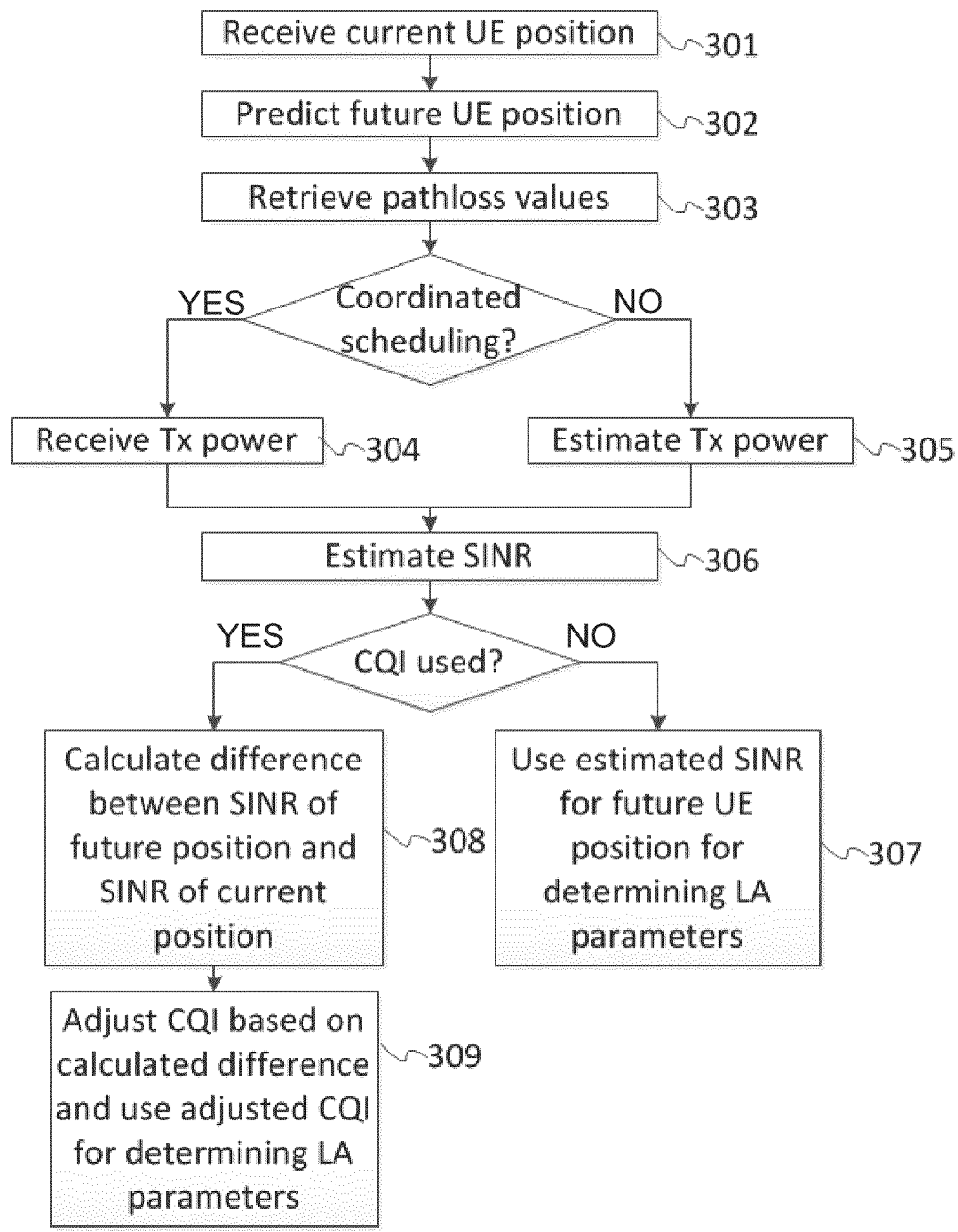
FIG. 3 is a flowchart illustrating a method in a radio network node according to embodiments.

Embodiments of a method for determining LA parameters for a UE are hereinafter described with reference to the flowchart in FIG. 3. The future position of the UE is predicted in 302. The future position is typically the position of the UE at the next scheduling occasion. The serving eNodeB may predict a future position of the UE based on a current position of the UE, and on an estimate of the UE moving speed and direction. The current position may in one embodiment be received from the UE, illustrated in 301. The moving speed may e.g. be predicted to be the same as the current speed which may be estimated based on historical positioning information. The eNodeB may predict a UE's moving direction in several ways. One way is to use historical positioning information and map information comprising data related to existing roads. Rapidly moving UEs are most probably located in a vehicle, and the vehicle's movement is restricted to roads. Therefore, the UE can only move along a road that matches current and possibly historical positions, and will probably continue in the same direction along the road. The future UE position in this movement may thus be predicted.

In 303, pathloss values related to the UE in the predicted future position for a serving cell and an interfering neighbor cell are retrieved. The pathloss values may be retrieved from one or more databases mapping positions to pathloss values. How such a database may be created is described below in the section Cell channel quality maps. Also pathloss values related to the UE in the current position for a serving cell and an interfering neighbor cell may be retrieved.

If coordinated scheduling is used, the transmitting power of the interfering cell(s) may be received, in 304, by reading the shared scheduling info comprising transmitted power for the different resource blocks. Otherwise, the transmitting power of the interfering cell(s) may be estimated, in 305, assuming an average radio resource utilization such as an average resource block utilization ratio, e.g. assuming that only 70% of the frequencies or resource blocks are utilized in average.

A first SINR value for the predicted future position of the UE is estimated, in 306, based on the serving cell pathloss value in the predicted future position, the interfering cell pathloss value in the predicted future position, and information about the transmission power used in the neighbor cell. One formula for estimating the SINR value is given by:

$$SINR = \frac{P_{own} * PL_{own}}{\sum_{i=1}^{i=n} P_{other,i} * PL_{other,i}} \quad [2]$$

where $P_{own}$ is the transmitting power of the serving cell, $PL_{own}$ is the pathloss of the serving cell, $P_{other,i}$ is the transmitting power of interfering cell i, and $PL_{own}$ is the pathloss of that interfering cell. There may be one or more interfering cells, i.e. n>0. Although the SINR is calculated in this embodiment of the invention, any other radio channel quality value may be estimated to be used for determining LA parameters.

In a first embodiment, the CQI that is received from the UE is not used. The LA parameters, such as the MCS scheme, are in 307 determined using the first SINR value estimated in 306 as the channel quality indicator. The serving cell may thus use the estimated first SINR value to select the MCS, without the assistance from other means such as a CQI measurement, and the ACK/NACK based OLLA.

In an alternative second embodiment, the CQI received from the UE is used, typically OLLA-adjusted. The LA parameters may in this embodiment be determined by comparing the SINR estimations in the future and in the current position and adjusting the conventionally derived CQI based on a difference between the two SINR estimations. A difference between the estimated first SINR value for the predicted future position and a second SINR value for the current position is thus calculated in 308. The calculated difference may then, in 309, be used to adjust the received CQI, or possibly the OLLA-adjusted CQI.

An advantage of using the method described with reference to FIG. 3 for determining LA parameters, is that the LA parameters may be adjusted in time to catch the rapid signal variation, e.g. if a rapidly moving UE is heading towards an area with a deep shadow from the serving cell, as in area B in the scenario described above with reference to FIG. 2, when the transmission point 201 correspond to the serving cell. Unnecessary transmission errors and retransmission are thus avoided. Furthermore, if the UE is going to move out of the deep shadow of the serving cell, i.e. from area B to area C, it may again adjust its LA parameters in time for the rapidly improved radio quality conditions and achieve an optimized throughput.

Cell Channel Quality Maps

As mentioned above, pathloss values for the serving cell or the neighbor cell in different positions may be retrieved from one or more databases storing pathloss values mapped to positions. In one embodiment, the database(s) is kept updated based on measurements reported by the UE. CQI values or pathloss values are measured by the UE and reported to the radio network node. The values are then stored together with information about the UEs current position.

There are at least three alternative embodiments A-C for how to obtain the UEs current position:
A. The UE reports the position information associated with the CQI measurement to the radio network node. The position information may be GPS coordinates, or other positioning system coordinates such as Beidou and Galileo.
B. A network based positioning method may be used to determine the UE position when a CQI or pathloss value is reported. The positioning method may use UE position measurements, such as observed time difference of arrival measurements to determine the UE position.
C. The radio network node may use a current positioning architecture and protocols to determine the UE position associated with the CQI or pathloss report. However a location protocol may not support a reporting of the UE position which is as frequent as e.g. the CQI reporting, which may be a disadvantage when building up the database.

In the alternative embodiment A described above, it may be an advantage to reduce the signaling overhead associated with the reporting of UE positions. Therefore, a UE may report only the last few digits of e.g. the UE GPS information. Further overhead reduction may be obtained by introducing two types of position information report. In the first type of report, the positioning information is given relative to the eNodeB position. In the second type of report, the positioning information is given relative to the position indicated by the latest report of the first type. The report of the first type may contain more bits than the report of the second type, but may on the other hand be reported less frequently than the report of the second type.

Furthermore, the UE position information may be reported simultaneously with the CQI report, if it is possible to measure the CQI at the position. Alternatively, the position information may be reported less often than the CQI. In that case the CQIs that are reported in between the position information reports are typically determined to be measured at the latest reported position.

Both the CQI values of the own cell, and pathloss values, such as Reference Signal Received Power (RSRP) values, of major interfering neighbor cells comprising the effect of shadow fading and other slow fading, may be reported by the UE to the serving radio network node. The interfering cell's identity should also be reported, possibly also together with the UE position. The reporting of pathloss values of neighbor cells may be configured to be performed periodically or may be triggered by higher layer signaling.

The radio network node may use current and previously reported values from UEs in its coverage area to determine statistical values of the CQI/pathloss values in the different positions. The statistical values and their corresponding positions may be used by a radio network node to build a channel quality map and an inter-cell interference map for its coverage area. The maps are thus continuously updated by recent UE reports from all the UEs in the coverage area.

In one embodiment, the radio network node divides its coverage area into square elements, and builds a two dimensional matrix mapping channel quality values to the square elements. The smaller the square elements are, the better the resolution of the channel quality map is. When the radio network node receives a UE report, it checks which square element in the matrix that is associated with the position reported and updates the matrix element value in accordance with the reported channel quality value. The update of the value may be either a direct update or an indirect filtered update based on both the current reported value and the old element value. The filtering may also be done based on the values reported by different UEs in the same matrix element. A channel quality map may in this way be built up and updated based on UE reports from UEs traversing the coverage area.

Method and Radio Network Node in FIGS. 4a-b, 5 and 6

Figure 4A:
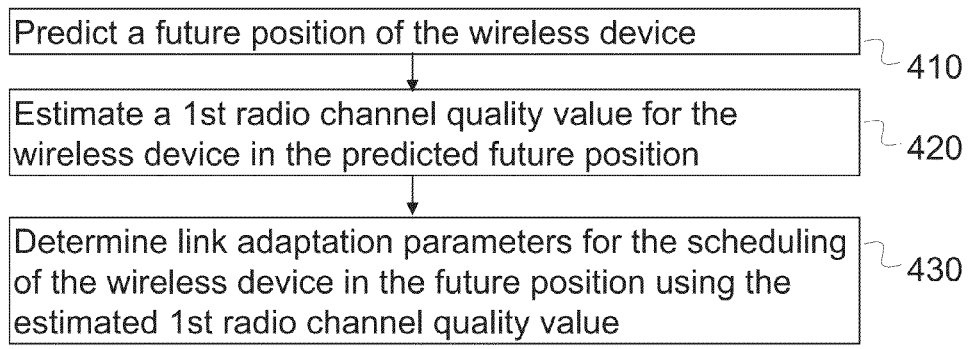
FIGS. 4a-b are flowcharts illustrating a method in a radio network node according to embodiments.

FIG. 4a is a flowchart illustrating a method for determining link adaptation parameters for a wireless device 103 according to embodiments of the invention. The method is performed in a first radio network node 100 of a wireless communication system. The first radio network node hosts a first cell 105 serving the wireless device. The wireless device is interfered by a second cell 155. The method comprises:

410: Predicting a future position of the wireless device. The future position may be the position of the wireless device at the next scheduling occasion. Furthermore, the future position may be predicted based on a current position, a speed and a moving direction of the wireless device.

420: Estimating a first radio channel quality value for the wireless device in the predicted future position. The estimation is based on: pathloss values related to the wireless device in the predicted future position for the first and the second cell respectively; and a transmission power of the second cell. The pathloss values related to the wireless device in the predicted future position may be retrieved from a database mapping positions to pathloss values for the first and the second cell respectively. In one embodiment, coordinated scheduling is used and the transmission power of the second cell is received from a second radio network node serving the second cell. In another embodiment, the transmission power of the second cell is estimated based on average radio resource utilization in the second cell.

- 430: Determining link adaptation parameters for the scheduling of the wireless device in the future position using the estimated first radio channel quality value. The determined LA parameters may comprise at least one of a parameter indicating a modulation scheme, and a parameter indicating a channel coding rate. In one embodiment, the CQI received from the wireless device is not used at all when determining the LA parameters. The LA parameters are thus simply determined based on the estimated first radio channel quality value.

Figure 4B:
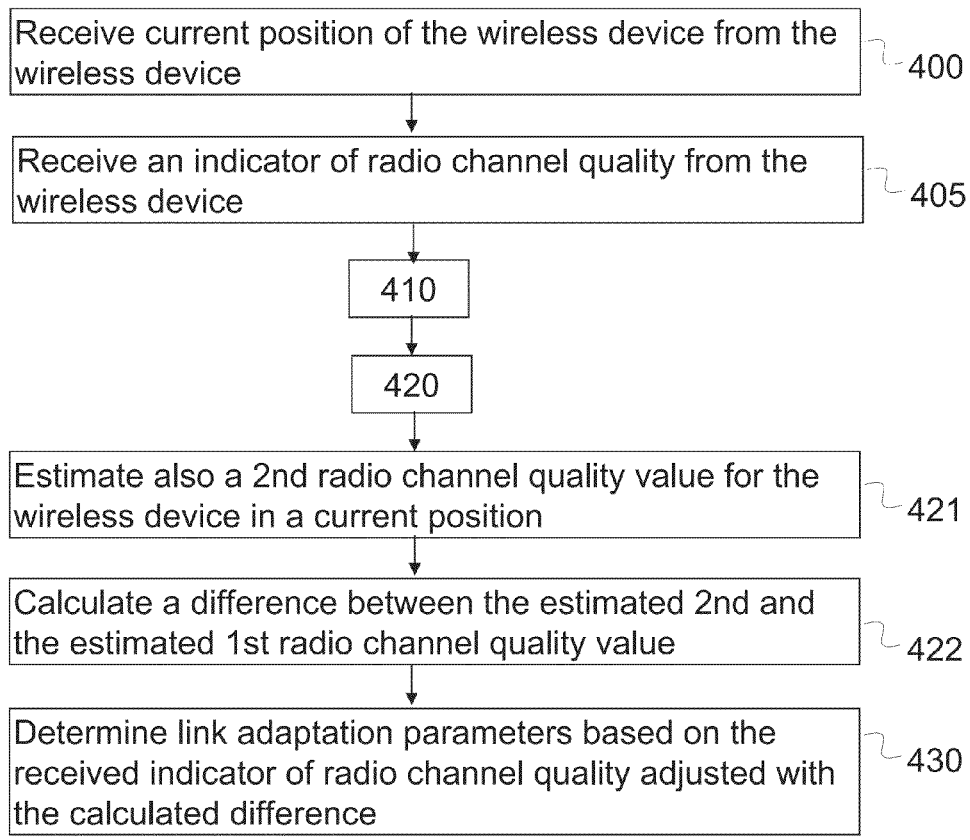

FIG. 4b is a flowchart illustrating the method for determining link adaptation parameters according to another embodiment of the invention. The method comprises:

- 400: Receiving the current position of the wireless device from the wireless device. The current position may comprise a position of the wireless device relative to a position of the first radio network node. Alternatively, the current position may comprise a position of the wireless device relative to a previously received position of the wireless device. As described above, there may be these two types of reports of the current position that alternate to reduce the signaling overhead. The report of the first type may contain more bits than the report of the second type, but may on the other hand be reported less frequently than the report of the second type.
- 405: receiving (405) an indicator of radio channel quality from the wireless device. The current position of the wireless device may be received simultaneously with the indicator of radio channel quality. However, as mentioned previously, it may also be possible to receive the wireless device position less often than the indicator of radio channel quality. The latest reported position may then be used when predicting the future position and when updating the channel quality maps.
- 410: Predicting a future position of the wireless device, as already described above with reference to FIG. 4a.
- 420: Estimating a first radio channel quality value for the wireless device in the predicted future position, as already described above with reference to FIG. 4a.
- 421: Estimating also a second radio channel quality value for the wireless device in a current position. The second radio channel quality value is estimated based on: pathloss values related to the wireless device in the current position for the first and the second cell respectively; and the transmission power of the second cell. The pathloss values related to the wireless device in the current position may be retrieved from the database mapping positions to pathloss values for the first and the second cell respectively.
- 422: Calculating a difference between the estimated second and the estimated first radio channel quality value.
- 430: Determining the LA parameters based on the received indicator of radio channel quality adjusted with the calculated difference.

The database mapping positions to pathloss values for the first and the second cell respectively may be regularly updated based on pathloss measurements received from wireless devices in the serving cell, where the pathloss measurements are associated to a position of the measuring wireless device. The received CQI may thus be associated with a received UE position, and the information may be used to update the mapping databases.

Figure 5:
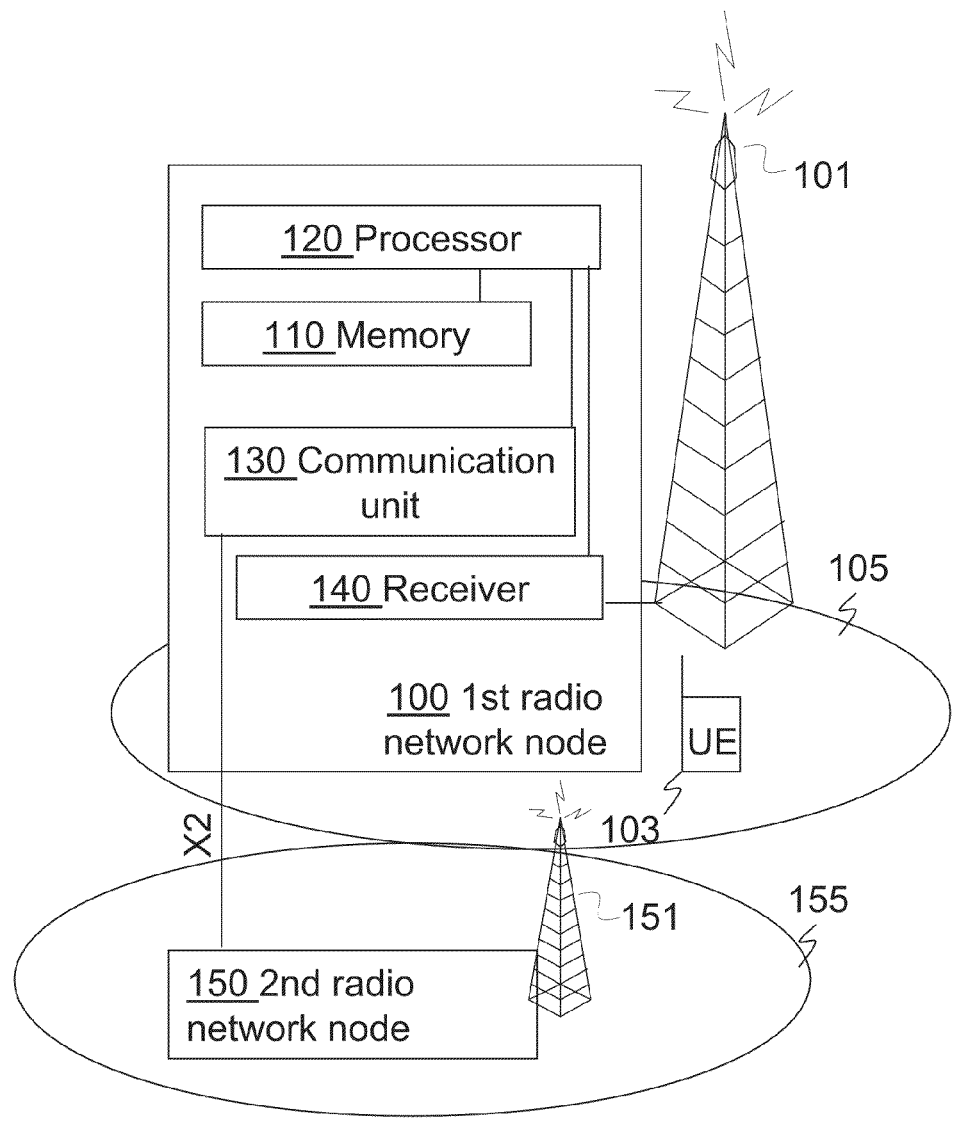
FIG. 5 is a block diagram schematically illustrating a radio network node according to embodiments.
Figure 6:
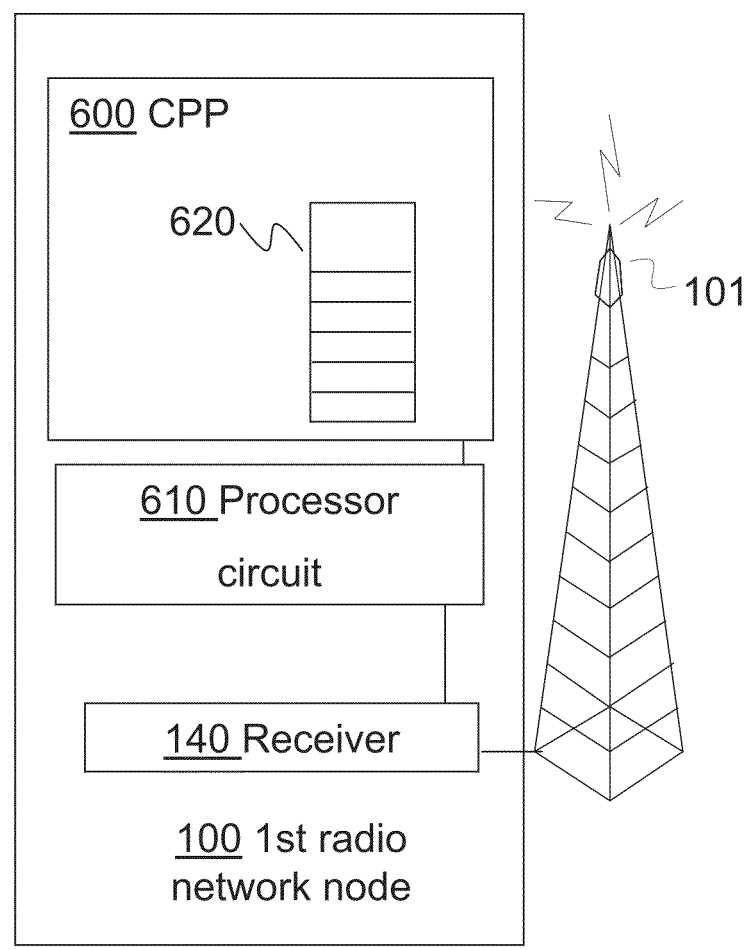
FIG. 6 is a block diagram schematically illustrating a computer program product comprising a computer program with code means which when run on a processor circuit causes the processor circuit to perform the method according to embodiments of the invention.

A first radio network node 100 for a wireless communication system is schematically illustrated in the block diagram in FIG. 5. The first radio network node 100 is configured to determine link adaptation parameters for a wireless device 103, and to host a first cell 105 serving the wireless device. The wireless device is interfered by a second cell 155. The first radio network node comprises a memory 110 and a processor 120, wherein the processor 120 is configured to predict a future position of the wireless device. The future position may be the position of the wireless device at the next scheduling occasion. The processor 120 is also configured to estimate a first radio channel quality value for the wireless device in the predicted future position, based on: pathloss values related to the wireless device in the predicted future position for the first and the second cell respectively; and a transmission power of the second cell. The processor 120 is further configured to determine link adaptation parameters for the scheduling of the wireless device in the future position using the estimated first radio channel quality value. The determined link adaptation parameters may comprise at least one of a parameter indicating a modulation scheme, and a parameter indicating a channel coding rate.

The processor 120 may also be configured to retrieve the pathloss values related to the wireless device in the predicted future position from a database mapping positions to pathloss values for the first and the second cell respectively.

In one embodiment, coordinated scheduling is used and the first radio network node 100 further comprises a communication unit 130 configured to receive the transmission power of the second cell from a second radio network node 150 serving the second cell 155. Alternatively, if no coordinated scheduling is used, the processor 120 is configured to estimate the transmission power of the second cell 155 based on average radio resource utilization in the second cell.

In any of the above described embodiments, the processor 120 may be configured to predict the future position based on a current position, a speed and a moving direction of the wireless device. The first radio network node 100 may further comprise a receiver 140 configured to receive the current position of the wireless device from the wireless device. The receiver may be connected to the receiving antenna of the transmission and receiving point 101 via one or more antenna ports. As already described above, the current position may comprise: a position of the wireless device relative to a position of the first radio network node; or a position of the wireless device relative to a previously received position of the wireless device. The advantage of the latter solution is that signaling overhead may be reduced when signaling the position.

In one embodiment, the CQI received from the wireless device is not used when determining the LA parameters and the processor 120 is configured to determine the link adaptation parameters based on the estimated first radio channel quality value.

In an alternative embodiment, the first radio network node 100 comprises a receiver 140 configured to receive an indicator of radio channel quality from the wireless device. Furthermore, the processor 120 is further configured to estimate also a second radio channel quality value for the wireless device in a current position, based on: pathloss values related to the wireless device in the current position for the first and the second cell respectively; and the transmission power of the second cell. The processor 120 is configured to calculate a difference between the estimated second and the estimated first radio channel quality value, and to determine the link adaptation parameters based on the received indicator of radio channel quality adjusted with the calculated difference.

The receiver 140 may be configured to receive the current position of the wireless device simultaneously with the indicator of radio channel quality.

The processor 120 may be configured to retrieve the pathloss values related to the wireless device in the current position from the database mapping positions to pathloss values for the first and the second cell respectively. Furthermore, the database mapping positions to pathloss values for the first and the second cell respectively may be regularly updated based on pathloss measurements received from wireless devices in the serving cell. The pathloss measurements may be associated to a position of the measuring wireless device.

In an alternative way to describe the embodiments in FIG. 5, the first radio network node 100 comprises, in addition to the receiver 140 already described above with reference to FIG. 5, a processor circuit 610 such as a Central Processing Unit (CPU) which may be a single unit or a plurality of units. Furthermore, the first radio network node 100 comprises at least one computer program product (CPP) 600 in form of a computer readable medium, e.g. a non-volatile memory such as an EEPROM (Electrically Erasable Programmable Read-Only Memory), a flash memory or a disk drive. The CPP 600 also comprises a computer program 620 stored on the computer readable medium. The computer program 620 in turn comprises computer readable code means which when run on the processor circuit 610 causes the processor circuit 610 to perform the method described earlier in conjunction with FIGS. 4a-b.

The above mentioned and described embodiments are only given as examples and should not be limiting. Other solutions, uses, objectives, and functions within the scope of the accompanying patent claims may be possible.

The invention claimed is:

1. A method for determining link adaptation parameters for a wireless device, the method being performed in a first radio network node of a wireless communication system, wherein the first radio network node hosts a first cell serving the wireless device, and wherein the wireless device is interfered by a second cell, the method comprising:
predicting a future position of the wireless device;
estimating a first radio channel quality value for the wireless device in the predicted future position, based on pathloss values related to the wireless device in the predicted future position for the first and the second cells respectively, and a transmission power of the second cell; and
determining link adaptation parameters for the scheduling of the wireless device in the future position using the estimated first radio channel quality value.

2. The method according to claim 1, wherein the pathloss values related to the wireless device in the predicted future position are retrieved from a database mapping positions to pathloss values for the first and the second cells respectively.

3. The method according to claim 2, wherein the database mapping positions to pathloss values for the first and the second cell respectively is regularly updated based on pathloss measurements received from wireless devices in the serving cell, wherein the pathloss measurements are associated to a position of the measuring wireless device.

4. The method according to claim 1, wherein the future position is the position of the wireless device at the next scheduling occasion.

5. The method according to claim 1, wherein the transmission power of the second cell is received from a second radio network node serving the second cell.

6. The method according to claim 1, wherein the transmission power of the second cell is estimated based on average radio resource utilization in the second cell.

7. The method according to claim 1, wherein the future position is predicted based on a current position, a speed and a moving direction of the wireless device.

8. The method according to claim 7, further comprising receiving the current position of the wireless device from the wireless device, wherein the current position comprises: a position of the wireless device relative to a position of the first radio network node; or a position of the wireless device relative to a previously received position of the wireless device.

9. The method according to claim 1, wherein the link adaptation parameters are determined based on the estimated first radio channel quality value.

10. The method according to claim 1, further comprising:
receiving an indicator of radio channel quality from the wireless device;
estimating a second radio channel quality value for the wireless device in a current position, based on pathloss values related to the wireless device in the current position for the first and the second cells respectively, and the transmission power of the second cell;
calculating a difference between the estimated second and the estimated first radio channel quality values, and wherein the link adaptation parameters are determined based on the received indicator of radio channel quality adjusted with the calculated difference.

11. The method according to claim 10, wherein the current position of the wireless device is received simultaneously with the indicator of radio channel quality.

12. The method according to claim 10, wherein the pathloss values related to the wireless device in the current position are retrieved from a database mapping positions to pathloss values for the first and the second cells, respectively.

13. The method according to claim 1, wherein the determined link adaptation parameters comprise at least one of a parameter indicating a modulation scheme, and a parameter indicating a channel coding rate.

14. A first radio network node for a wireless communication system, wherein the first radio network node is configured to determine link adaptation parameters for a wireless device and to host a first cell serving the wireless device, and wherein the wireless device is interfered by a second cell, the first radio network node comprising a memory and an associated processor, wherein the processor is configured to:
predict a future position of the wireless device;
estimate a first radio channel quality value for the wireless device in the predicted future position, based on pathloss values related to the wireless device in the predicted future position for the first and the second cells, respectively, and a transmission power of the second cell; and
determine link adaptation parameters for the scheduling of the wireless device in the future position using the estimated first radio channel quality value.

15. The first radio network node according to claim 14, wherein the processor is configured to retrieve the pathloss values related to the wireless device in the predicted future position from a database mapping positions to pathloss values for the first and the second cell respectively.

16. The first radio network node according to claim 15, wherein the database mapping positions to pathloss values for the first and the second cell respectively is regularly updated based on pathloss measurements received from wireless devices in the serving cell, wherein the pathloss measurements are associated to a position of the measuring wireless device.

17. The first radio network node according to claim 14, wherein the future position is the position of the wireless device at the next scheduling occasion.

18. The first radio network node according to claim 14, further comprising a communication unit configured to receive the transmission power of the second cell from a second radio network node serving the second cell.

19. The first radio network node according to claim 14, wherein the processor is configured to estimate the transmission power of the second cell based on average radio resource utilization in the second cell.

20. The first radio network node according to claim 14, wherein the processor is configured to predict the future position based on a current position, a speed and a moving direction of the wireless device.

21. The first radio network node according to claim 20, further comprising a receiver configured to receive the current position of the wireless device from the wireless device, wherein the current position comprises: a position of the wireless device relative to a position of the first radio network node; or a position of the wireless device relative to a previously received position of the wireless device.

22. The first radio network node according to claim 14, wherein the processor is configured to determine the link adaptation parameters based on the estimated first radio channel quality value.

23. The first radio network node according to claim 14, comprising a receiver configured to receive an indicator of radio channel quality from the wireless device, and wherein the processor is further configured to:
estimate a second radio channel quality value for the wireless device in a current position, based on pathloss values related to the wireless device in the current position for the first and the second cells, respectively, and the transmission power of the second cell;
calculate a difference between the estimated second and the estimated first radio channel quality value; and
wherein the processor is configured to determine the link adaptation parameters based on the received indicator of radio channel quality adjusted with the calculated difference.

24. The first radio network node according to claim 23, wherein the receiver is configured to receive the current position of the wireless device simultaneously with the indicator of radio channel quality.

25. The first radio network node according to claim 23, wherein the processor is configured to retrieve the pathloss values related to the wireless device in the current position from a database mapping positions to pathloss values for the first and the second cell respectively.

26. The first radio network node according to claim 14, wherein the determined link adaptation parameters comprise at least one of a parameter indicating a modulation scheme, and a parameter indicating a channel coding rate.

27. A computer program product comprising a computer program stored in a computer readable medium, said computer program comprising program instructions for execution by a processor in a first radio network node that is configured to host a first cell in a wireless communication system, and wherein said program instructions when executed configure the processor to:
predict a future position of a wireless device for which the first cell is a serving cell;
estimate a first radio channel quality value for the wireless device in the predicted future position, based on pathloss values related to the wireless device in the predicted future position for the first cell and for a second cell that interferes with the wireless device, and based on a transmission power of the second cell; and
determine link adaptation parameters for the scheduling of the wireless device in the future position using the estimated first radio channel quality value.

* * * * *